(12) United States Patent
Safranek et al.

(10) Patent No.: US 6,226,714 B1
(45) Date of Patent: May 1, 2001

(54) METHOD FOR INVALIDATING CACHE LINES ON A SHARING LIST

(75) Inventors: Robert J. Safranek; Michael A. Driscoll, both of Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/121,603

(22) Filed: Jul. 9, 1998

Related U.S. Application Data (60) Provisional application No. 60/052,557, filed on Jul. 15, 1997.

(51) Int. Cl.[7] .................................................. G06F 12/08
(52) U.S. Cl. ............................ 711/119; 711/133; 711/144
(58) Field of Search ..................................... 711/133, 144, 711/119, 147, 148, 159; 709/201, 213, 214

(56) References Cited

U.S. PATENT DOCUMENTS

| | | | | |
|---|---|---|---|---|
| 4,747,043 | * | 5/1988 | Rodman | 711/124 |
| 5,197,146 | * | 3/1993 | LaFetra | 711/144 |

OTHER PUBLICATIONS

Thapar et al., "Distributed–Directory Scheme: Stanford Distributed–Directory Protocol", Computer vol. 23, Issue 6, Jun. 1990; pp. 78–80.*

Schneider et al., "Concepts in Data Structures and Software Development", West Publishing Company, 1991; pp. 137–141.*

Kruse et al., "Data Structures and Program Design in C", Prentice Hall, 1991; p. 113.*

*Multiprocessor Interconnection Using SCI*, Master Thesis by Ivan Tving, DTH ID–E 579, PP. 1–60 (Feb. 2, 1994).

"SCI (Scalable Coherent Interface) Cache Coherence," *Cache and Interconnect Architectures in Multiprocessors*, by David V. James, Apple Computer, MS 22Y, pp. 189–208 (1990).

* cited by examiner

*Primary Examiner*—Reginald G. Bragdon
(74) *Attorney, Agent, or Firm*—Klarquist Sparkman Campbell Leigh and Whinston LLP (57) ABSTRACT

A method of invalidating cache lines on an SCI sharing list by forwarding an invalidate request from node to node of a multiprocessor computer, such as a distributed shared memory (DSM) or non-uniform memory access (NUMA) machine. From the node at the head of the list, an invalidate request is sent to a succeeding node on the list. In response to receiving the invalidate request, the succeeding node checks the state of its cache line to determine whether it is the tail of the list and also invalidates the cache line. If the succeeding node is not the tail of the list, it forwards the invalidate request to the next succeeding node on the list. This next succeeding and other succeeding nodes then repeat the steps of invalidating the cache line and forwarding the invalidate request until the node that is the tail of the list is reached. The tail node responds by sending an invalidate response to the node at the head of the sharing list.

13 Claims, 8 Drawing Sheets

PRIOR ART LIST INVALIDATION SCHEME

| LOCK | MEMORY STATE | HEAD POINTER |

MEMORY TAG 34

FIG. 5A

| ADDRESS | CACHE STATE | FORWARD POINTER | BACKWARD POINTER | VALID | LOCKED |

REMOTE CACHE TAG 36

INVALIDATE REQUEST PACKET

| DESTINATION ID |
| --- |
| CMD/RSP |
| SOURCE ID |
| TRANSACTION ID |
| ADDRESS 0 |
| ADDRESS 1 |
| ADDRESS 2 |
| EXTENDED HEADER (OPTIONAL) |
| ORIGINAL SOURCE ID |
| ORIGINAL TRANSACTION ID |
| DATA (OPTIONAL AMOUNT) |
| CRC |

FIG. 7A

INVALIDATE RESPONSE PACKET

| DESTINATION ID |
| --- |
| CMD/RSP |
| SOURCE ID |
| TRANSACTION ID |
| CACHE STATE |
| FORWARD POINTER |
| BACKWARD POINTER |
| EXTENDED HEADER (OPTIONAL) |
| ORIGINAL SOURCE ID |
| ORIGINAL TRANSACTION ID |
| DATA (OPTIONAL AMOUNT) |
| CRC |

FIG. 8C

METHOD FOR INVALIDATING CACHE LINES ON A SHARING LIST

RELATED APPLICATION DATA

This application is based on provisional U.S. patent application Ser. No. 60/052,557, entitled, SCI CACHE COHERENCE LIST INVALIDATION METHODOLOGY, filed Jul. 15, 1997.

FIELD OF THE INVENTION

This invention relates generally to multiprocessor computers that are comprised of a number of separate but interconnected processor nodes. More particularly, this invention relates to a method for efficiently communicating a request to a list such as for invalidating cache lines that reside on the separate nodes and share the same data when a copy of the data in one of the lines is changed.

BACKGROUND OF THE INVENTION

Multiprocessor computers by definition contain multiple processors that can execute multiple parts of a computer program or multiple distinct programs simultaneously, in a manner known a s parallel computing. In general, multiprocessor computers execute multithreaded-programs or single-threaded programs faster than conventional single processor computers, such as personal computers (PCs), that must execute programs sequentially. The actual performance advantage is a function of a number of factors, including the degree to which parts of a multithreaded-program and/or multiple distinct programs can be executed in parallel and the architecture of the particular multiprocessor computer at hand.

Multiprocessor computers may be classified by how they share information among the processors. Shared memory multiprocessor computers offer a common physical memory address space that all processors can access. Multiple processes or multiple threads within the same process can communicate through shared variables in memory that allow them to read or write to the same memory location in the computer. Message passing multiprocessor computers, in contrast, have a separate memory space for each processor, requiring processes in such a system to communicate through explicit messages to each other.

Shared memory multiprocessor computers may further be classified by how the memory is physically organized. In distributed shared memory (DSM) machines, the memory is divided into modules physically placed near each processor. Although all of the memory modules are globally accessible, a processor can access memory placed nearby faster than memory placed remotely. Because the memory access time differs based on memory location, distributed shared memory systems are also called non-uniform memory access (NUMA) machines. In centralized shared memory computers, on the other hand, the memory is physically in one location. Centralized shared memory computers are called uniform memory access (UMA) machines because the memory is equidistant in time from each of the processors. Both forms of memory organization typically use high-speed cache memory in conjunction with main memory to reduce execution time.

Multiprocessor computers with distributed shared memory are organized into nodes with one or more processors per node. Also included in the node are local memory for the processors, a remote cache for caching data obtained from memory in other nodes, and logic for linking the node with other nodes in the computer. A processor in a node communicates directly with the local memory and communicates indirectly with memory on other nodes through the node's remote cache. For example, if the desired data is in local memory, a processor obtains the data directly from a block (or line) of local memory. But if the desired data is stored in memory in another node, the processor must access its remote cache to obtain the data. A cache hit occurs if the data has been obtained recently and is presently stored in a line of the remote cache. Otherwise a cache miss occurs, and the processor must obtain the desired data from the local memory of another node through the linking logic and place the obtained data in its node's remote cache.

Further information on multiprocessor computer systems in general and NUMA machines in particular can be found in a number of works including *Computer Architecture: A Quantitative Approach* ($2^{nd}$ Ed. 1996), by D. Patterson and J. Hennessy, which is incorporated by reference.

Data coherency is maintained among the multiple caches and memories of a distributed shared memory machine through a cache coherency protocol such as the protocol described in the Scalable Coherent Interface (SCI)(IEEE 1596). Central to the coherency protocol is the use of doubly linked sharing list structures to keep track of the cache lines from separate remote caches that share the same data. When the data in one of the linked cache lines changes, such as by a processor writing to the line, the other cache lines on the list are determined and then invalidated, and the list is purged (i.e., dissolved).

An SCI sharing list is constructed using tags that are associated with each line of memory and each line of a remote cache. The memory tag includes a state field and a head pointer that, when a sharing list exists for the memory line, points to the node that is the head of the list. The cache tag includes a state field, a backward pointer to the next list element toward the memory line and a forward pointer to the next list element toward the tail of the list. If the node is the head of the list, the backward pointer of the cache line points to the memory line whose data it is caching.

A sharing list is formed or increased whenever a processor tries to read from or write to a line of data that is not present in its remote cache or local memory. In these cases a processor will request the data from the remote memory storing the data. If no cached copies of the line exist in the computer system, then memory responds with the data. A sharing list is formed with a cache line on the requesting processor's node now storing the data. The pointers in the memory and cache line tags are changed to designate the node containing the cache line as the head of the list, with the cache line's forward pointer set to null since there are no other list elements. If a cached copy of the data already exists in the computer system, the memory still responds with the data if it is valid; otherwise, the data is obtained from the present head of the list. Again, the pointers in the memory and cache line tags are then changed to designate the node reading or writing the data as the head of the list.

Figure 1A:
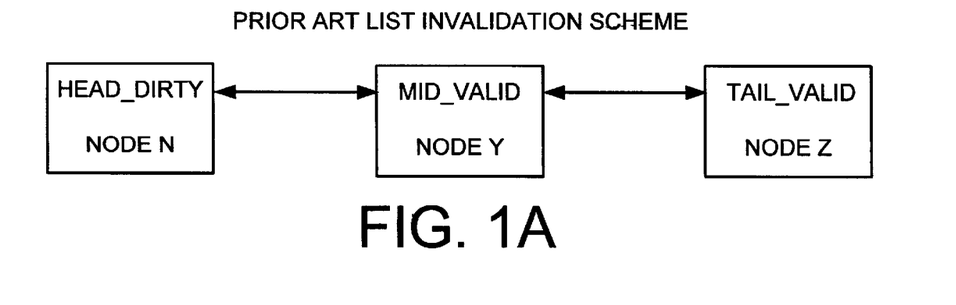
FIGS. 1A–C are a series of figures showing a conventional sharing list invalidation scheme.
Figure 1B:
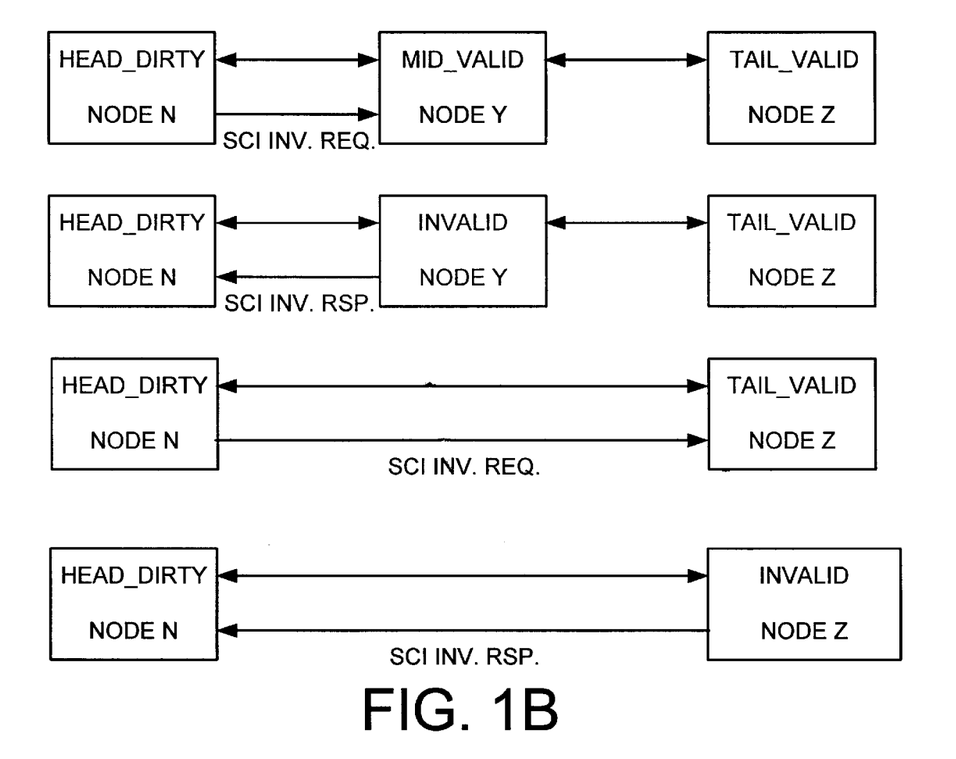
Figure 1C:
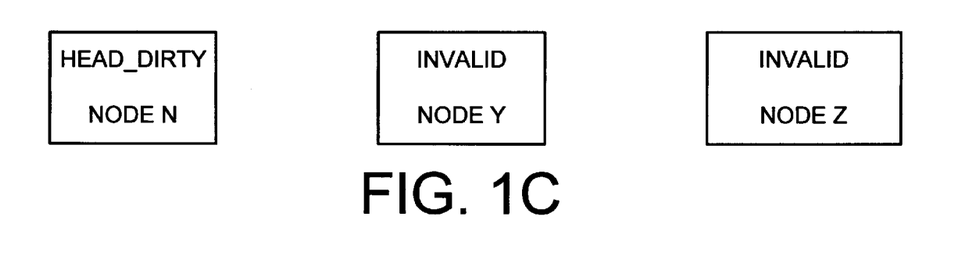

When a processor writes to a memory line that points to a sharing list, the list must be invalidated since the other cache lines on the list no longer have copies of the most current data. The SCI scheme for invalidating a sharing list is shown in FIGS. 1A–C, where a processor has written to the cache line whose node is at the head of the list. (If a processor attempts to write to a cache line whose node is not the head of a list, that node is first made the head of the list.) In FIG. 1A, the state of a sharing list is shown before the scheme is initiated. Node N is the head of the list. As indicated by the bidirectional arrows, its cache line points forward to node Y, whose cache line points backward to node N. Similarly, the cache line on node Y points forward to node Z, whose cache line points backward to node Y. Since the cache line on node Z does not point forward to another cache line in this example, it is the tail of the list. In FIG. 1B, node N issues an SCI invalidate request to node Y to remove its cache line from the list. Node Y responds by changing the state of its cache line to indicate its data is invalid and by issuing an invalidate response to node X. This response confirms that the cache line has been invalidated and that node Y has been removed from the list. The response also includes the forward pointer to node Z. Using this forward pointer, node N then issues an SCI invalidate request to node Z to remove its cache line from the list. Node Z responds by changing the state of its cache line to indicate its data is invalid and by issuing an invalidate response to node N. FIG. 1C shows the state of the nodes' cache lines after the sequence of invalidate requests is complete and the sharing list has been dissolved. The state of the cache line on node N indicates that only its cache line now has valid data (even the memory data is invalid). The states of the cache lines on nodes Y and Z indicate that their copies of the data are invalid.

Although this scheme works, it is relatively slow. An invalidate request requires a response by each element of the sharing list to the head. Eliminating these multiple responses would accelerate the purging of sharing lists and thereby improve the overall performance of computer systems running protocols such as the SCI cache coherence protocol.

An objective of the invention, therefore, is to accelerate the communication of requests to a list of elements such as lists created under the SCI protocol.

SUMMARY OF THE INVENTION

A method of invalidating cache lines on a sharing list in accordance with the invention includes the following steps. From the node at the head of the list, an invalidate request is sent to a succeeding node on the list. In response to receiving the invalidate request, the succeeding node checks the state of the its cache line to determine whether it is the tail of the list and also invalidates the cache line. If the succeeding node is not the tail of the list, it forwards the invalidate request to the next succeeding node on the list. The next succeeding node and further succeeding nodes then repeat the steps of invalidating its cache line and forwarding the invalidate request until the node that is the tail of the list is reached. The tail node responds by sending an invalidate response to the node at the head of the sharing list.

In one aspect of the invention, the invalidate request and invalidate response are sent as data packets between nodes. The invalidate request packet carries the identification of the head of the list as the packet is forwarded from node to node to the tail of the list. The tail node uses this identification to send a response packet to the head of the list.

In another aspect of the invention, it may be used generally to communicate requests from a requesting node to a number of responding nodes on a list.

DETAILED DESCRIPTION OF AN ILLUSTRATIVE EMBODIMENT

The invention has been implemented within a multiprocessor computer system such as the one shown and described herein. It should be readily recognized from this disclosure, however, that the invention is not limited to this implementation but can be applied in any suitable computer system using a cache coherence scheme to link together cache lines that share data.

Figure 2:
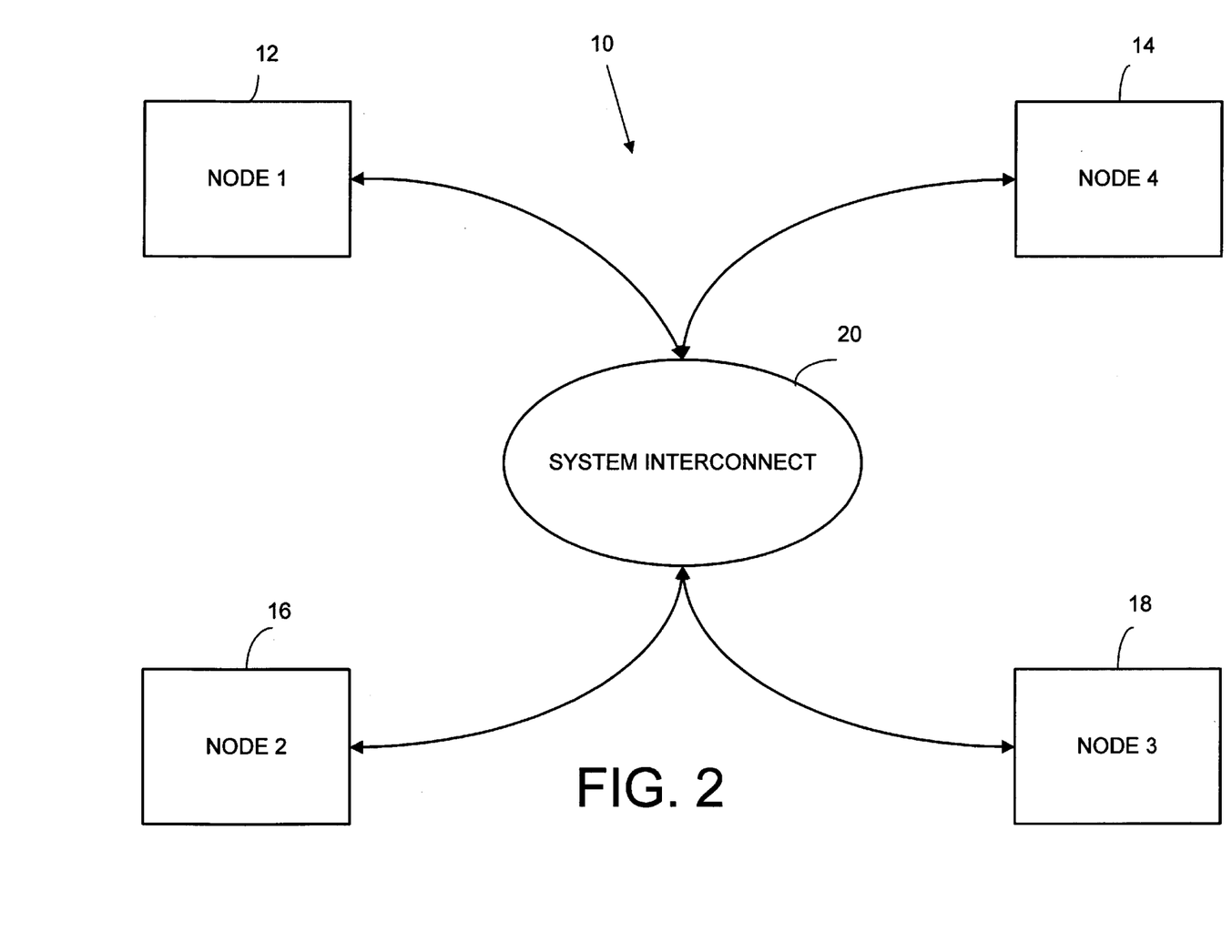
FIG. 2 is a block diagram of a multiprocessor computer having multiple nodes, with a system interconnect coupling the nodes together.

FIG. 2 is a block diagram of a multiprocessor computer system 10 that uses a computer architecture based on distributed shared memory (DSM). This type of computer system is also known as a NUMA machine. Four nodes 12, 14, 16, and 18 are shown connected by a system interconnect 20 (i.e., a network) that permits any node to communicate with any other node. The purpose of system interconnect 20 is to allow processors in any node to directly and transparently access the physical memory that resides in any other node. System interconnect 20 is a switch-based network that in the illustrative embodiment uses the Scalable Coherent Interface (SCI) interconnection mechanism. SCI is an IEEE-approved standard that is well documented in a number of publications including *IEEE Std* 1596-1992 (Aug. 2, 1993) and *Multiprocessor Interconnection Using SCI*, a Master Thesis by Ivan Tving, DTH ID-E 579 (1994), both of which are incorporated by reference. A multiprocessor computer system using the SCI mechanism is shown and described in U.S. Pat. No. 5,802,578, which is also incorporated by reference.

The physical links of interconnect 20 provide high bandwidth and low latency and are scalable to allow for the addition of more nodes. Links that meet these requirements presently include point-to-point interconnects with a data throughput of one gigabyte/second or greater. The links can be configured in any number of suitable ways for connecting nodes 12, 14, 16, and 18, such as in a ring topology, in arbitrary topologies through switches, or in a combination of both. The links can be wired or wireless (optical, RF, etc.) depending upon system performance needs. Additional topologies are described in "Interconnect Topologies with Point-To-Point Rings," Ross E. Johnson and James E. Goodman, December 1991, *Computer Sciences Technical Report* #1058, University of Wisconsin-Madison, which is incorporated by reference.

Node Overview

Figure 3:
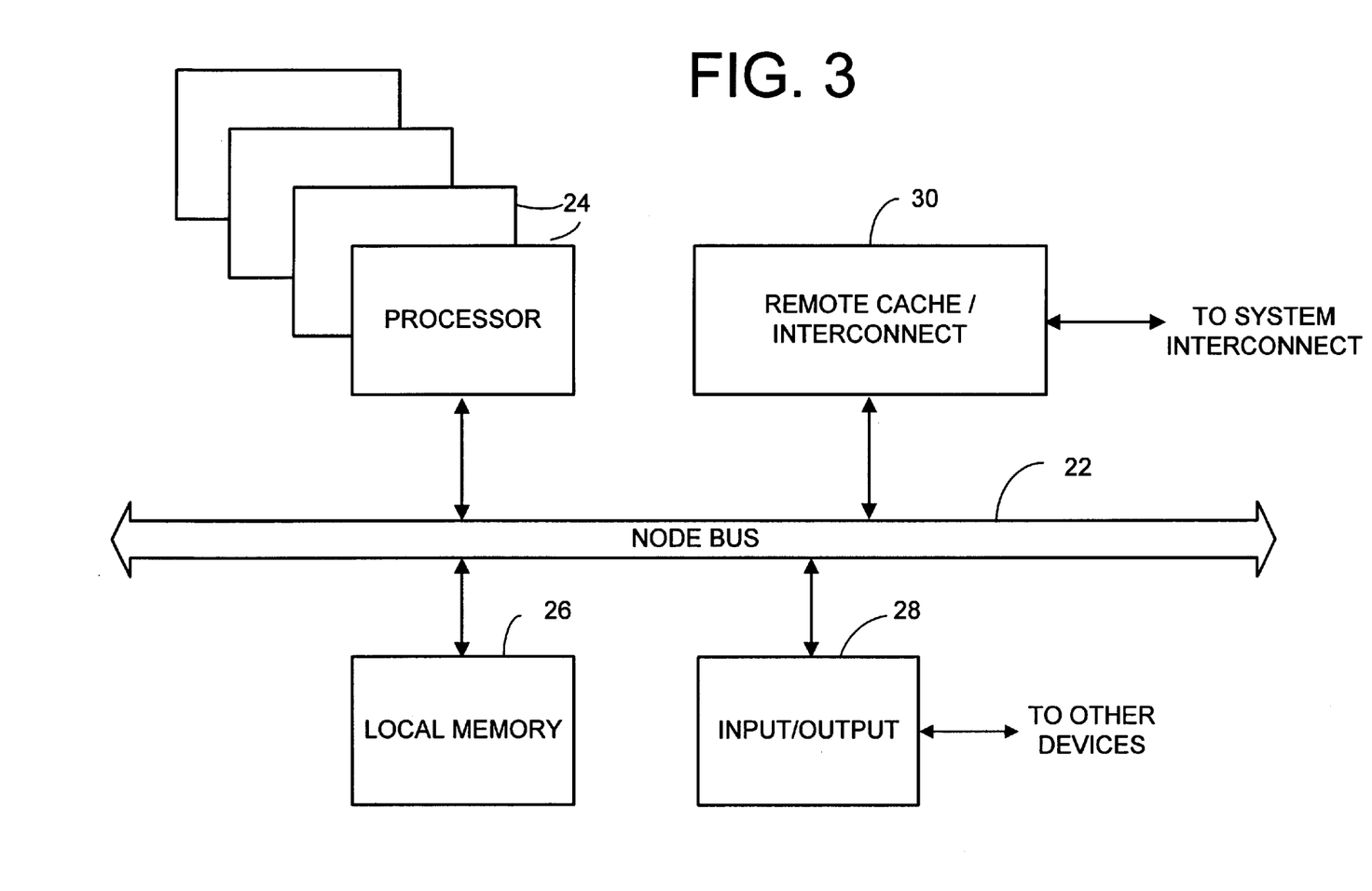
FIG. 3 is a block diagram of one of the nodes of the multiprocessor computer of FIG. 2.

A block diagram of node 12 on system 10 is shown in FIG. 3. The node includes a symmetric multiprocessor (SMP) node bus 22 for connecting multiple data processors 24 to local memory 26. For clarity, nodes 12, 14, 16, and 18 may be referred to as home nodes or remote nodes. A home node is one whose local memory stores a memory block of interest (i.e., the physical address of the memory block falls within the address range supported by the local memory or cache); all of the other nodes are then remote nodes with respect to that memory block. Additionally, a node may be a requesting node or a responding node. A requesting node is one requesting data; a responding node is one furnishing requested data. Input/output (I/O) device 28, which is also connected to bus 22, connects the node to devices outside computer system 10 for communicating information between the computer system and the outside world. I/O device 28 may be of conventional design and includes means for connecting the node (and hence system 10) to personal computers, local area networks, etc., that wish to communicate with the computer system 10. The I/O device 28 may also allow for connection to peripheral devices, such as floppy disks, hard disks, CD-ROMs, etc. To connect node 12 to the other nodes in the system, the node includes a system interconnect interface 30. The system interconnect interface forms part of interconnect 20 along with the physical links between nodes and the interface devices on the other nodes of the computer system 10. In the illustrative embodiment, interface 30 is constructed to implement the SCI standard for data communication between the nodes, allowing a processor on one node to transparently access memory physically located on another node. The interface 30 also contains a remote cache in the illustrative embodiment, although the remote cache could also be separate from the system interconnect interface.

Figure 4:
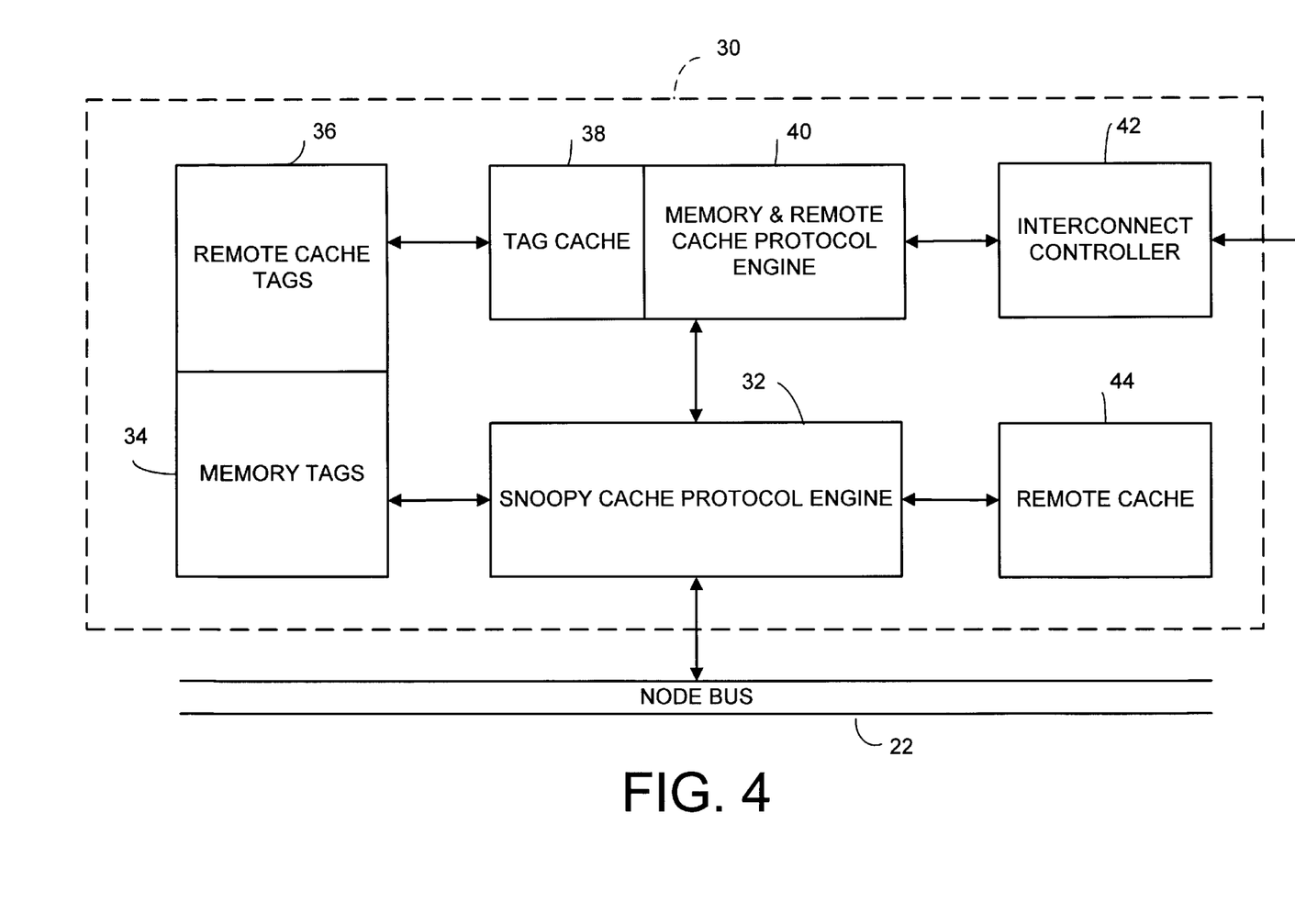
FIG. 4 is a block diagram of an interconnect device within the node of FIG. 3.

FIG. 4 is a block diagram showing the interconnect device 30 in more detail. The device includes a snoopy cache protocol engine 32; storage for memory and remote cache tags 34 and 36; a tag cache 38; a memory & remote cache protocol engine 40; an interconnect controller 42; and a remote cache 44.

The SCI Cache Coherence Scheme

To maintain coherence among the remote caches in the nodes of computer system 10, the system uses a chained directory scheme defined in the SCI protocol. The chained directory is implemented as a doubly linked sharing list that keeps track of which caches share the same data. With this sharing list, remote caches can be notified when the data they share has been changed and thus is no longer valid. FIG. 5B shows the makeup of a remote cache tag 36, which makes the associated cache line and node an element of a sharing list. The remote cache tag is linked into the chained directory to indicate that the node's remote cache 44 contains a copy of the shared data. A cache tag 36 contains a number of fields including an Address field, which identifies the memory block cached in the remote cache, and a Cache State (CS) field, which gives the state of the cache. Table 1 outlines pertinent cache states.

TABLE 1

| Cache State | Description |
| --- | --- |
| CS_INVALID | Line is invalid and can be used for caching new lines |
| CS_ONLY_FRESH | Only cached copy, consistent with memory |
| CS_ONLY_DIRTY | Only cached copy, write-able and inconsistent with memory |
| CS_HEAD_FRESH | Head of fresh list, consistent with memory |
| CS_HEAD_DIRTY | Head of valid list, writ-able and inconsistent with memory |
| CS_MID_VALID | Mid element in valid list, possibly inconsistent with memory |
| CS_TAIL_VALID | Tail of valid list, possibly inconsistent with memory |

The other fields of the cache tag 36 are well defined in the SCI protocol. The Forward Pointer field contains a pointer to a previous cache in the sharing list, toward the list tail. The Backward Pointer field contains a pointer to a later cache in the sharing list, toward the list head (or to memory if the node containing the cache line is the head of the list). Elements are added to a sharing list as the head of the list, with the oldest element thus being the tail of the list. The Valid field is set to indicate that the cache tag is valid. The Locked field is set to indicate that this cache tag is to presently remain in the cache tag storage and not be replaced by the cache line replacement algorithm.

Figure 5A:
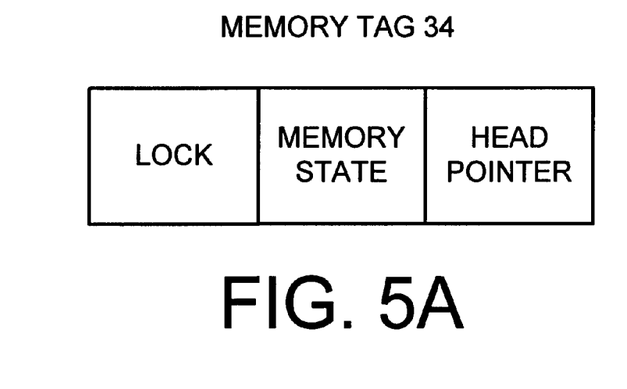
FIGS. 5A and 5B are diagrams showing the fields of a memory tag and a cache tag, respectively.
Figure 5B:
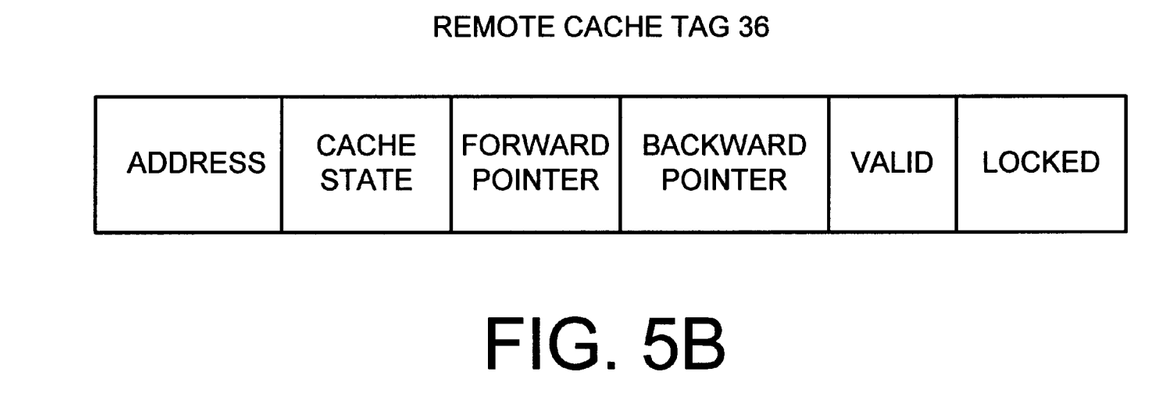

FIG. 5A shows fields of a memory tag 34, which maintains the state of local memory 26. The memory tags store information about the states of the memory blocks (lines) stored within local memory 26. The tag has two pertinent fields: a Memory State field which indicates the state of the data in the memory block, and a Head Pointer field that points to the cache that is the head of a sharing list containing the memory line's data. Table 2 identifies and describes typical memory states.

TABLE 2

| Memory State | Desciption |
| --- | --- |
| MS_HOME | No sharing list exists and memory is valid |
| MS_FRESH | Sharing list copies are identical with memory |
| MS-GONE | Sharing list copies might be different from memory |
| MS_BUSY | Memory state is being changed |

Table 3 shows typical cache states in a sharing list for a given memory state. Note that the cache state also reflects the location of the cache in the sharing list: head, midpoint, or tail.

TABLE 3

| Memory | Head | Mid | Tail |
| --- | --- | --- | --- |
| MS_HOME | — | — | — |
| MS_FRESH | CS_ONLY_FRESH | — | — |
| MS_FRESH | CS_HEAD_FRESH | — | CS_TAIL_VALID |
| MS_FRESH | CS_HEAD_FRESH | CS_MID_VALID | CS_TAIL_VALID |
| MS_GONE | CS_ONLY_DIRTY | — | — |
| MS_GONE | CS_HEAD_DIRTY | — | CS_TAIL_VALID |
| MS_GONE | CS_HEAD_DIRTY | CS_MID_VALID | CS_TAIL_VALID |

Creating a Sharing List

The way in which the SCI protocol constructs a sharing list can now be explained by way of example. If a processor 24 in node 12 requests data, the request is first reviewed by snoopy cache protocol engine 32. The protocol engine compares the address of the requested data with the memory tags 34 and remote cache tags 36 to determine if the data is stored in the node. If the data's address is in local memory, then node 12 is the home node for the memory block containing the data. A memory tag 34 exists and indicates whether the data is valid and, if not, indicates through its head pointer on which node the valid data can be found (i.e., the location of the head of the sharing list). If the data's address is not in local memory 26, there is no memory tag 34 for it. However, if a copy of the data has previously been stored in remote cache 44, then a cache tag 36 exists in the node for the data. The tag 36 indicates whether the data is valid. If invalid, the processor 24 obtains a copy of the valid data and becomes the new head of the list, as described below.

If the processor request is a write, the protocol engine 32 reviews the address to determine if a memory tag 34 or cache tag 36 exists in the node for the address. The procedure is the same as for the read, except that a present sharing list containing the data to be changed by the write is invalidated. If the data to be changed is already in remote cache 44, then the node is already on a sharing list. Unless the node is already the head of the list, it is first removed from the list and then made the head before the list is invalidated. Protocol engine 40 on node 12 sends a message to the node "below" it on the list, passing it its backward pointer so that the node below now points to the node "above" node 12. Protocol engine 40 then sends a message to the node above, passing it its forward pointer so that the node above now points to the node below. Node 12 is now off the sharing list. Protocol engine 40 now sends a message to the home node for the data being changed, indicating that it wants to be head of the list and be allowed to write the memory block containing the data. The home node responds by setting its head pointer to point to node 12, changing its memory state to GONE, and returning the requested data in the memory block and the pointer to the "old" head of the current sharing list for the memory block. Finally, protocol engine 40 sends a message to the old head informing the old head that it is no longer the head and proceeds to invalidate the present sharing list. The cache state of tag 36 in node 12 for this memory block is now ONLY_DIRTY, since it is presently the only element of a new sharing list and is inconsistent with the data in memory. If processors in other nodes read this data, these nodes will be added to the new list and the state of tag 36 for this cache line will change to TAIL.

Messages are sent between nodes through the memory & remote cache protocol engine 40 and interconnect controller 42 in standard SCI format. Engine 40 puts together an appropriate SCI packet and passes it to controller 42 for sending to the desired node. The interconnect controller provides the SCI-compliant link-level interface to the other nodes of system 10. It also contains the link-level queues and the associated arbitration, queue mechanisms, and error checking to provide SCI-packet delivery services for the node.

Returning to the example, if the requested valid data is not in remote cache 44 or local memory 26, the snoopy cache protocol engine 32 passes the data request to remote cache protocol engine 40. Engine 40 then sends the request in the manner described via controller 42 to the home node for the data, such as node 14. The memory tag for the requested memory line in node 14 is checked to determine if the data stored in memory is valid (HOME or FRESH). If so, node 14 returns a copy of the data to node 12. If not, the head pointer field of the memory tag is checked to find the head of the list, and a copy of the data is obtained therefrom. The memory tag's head pointer in node 14 is changed to point to remote cache 44 on node 12 as the new head of the sharing list. If the processor request from node 12 is for a possible write, the tag's memory state is also changed, to GONE since the cache line and memory will soon be inconsistent.

The data retrieved from memory on node 14 is sent to node 12 and provided to the processor as well as stored in remote cache 44. A remote cache tag 36 is then created for the stored data. At this point, the address of the retrieved memory block, the cache state and the backward pointer (to the node where the memory from which the data was retrieved is located, here node 14) are known and these fields in the cache tag 36 in node 12 are completed. If the processor request is a write, then remote cache 44 is now the head of a new sharing list and there is no forward pointer to other list elements. If the processor request is a read and the memory state is FRESH (indicating at least one remote cache has a valid copy of the memory's data line), then the tag's forward pointer is set to point to the node having the valid copy.

The list will grow as other nodes obtain copies of the data in remote cache 44. For example, if node 14, 16 or 18 requests the same data now in the remote cache of node 12, the requesting node becomes the head of the list. The backward pointer for the remote cache tag in node 12 changes from pointing to the node whose memory contains the data to pointing to the node that is the new list head.

Invalidating a Sharing List

Sharing lists of cache lines are maintained so that all nodes that share the same data can be notified when the shared data is changed. For example, assume that a sharing list for a certain memory block located in local memory of node 18 is headed by node 14 and also contains node 12 and node 16. If a processor 24 in node 12 now writes to this block in its remote cache 44, as in the above example, then the other nodes on the sharing list are serially notified to invalidate their copies of the data and the list is purged (i.e., dissolved). This is known as invalidating a sharing list. As shown in FIGS. 1A–C, the conventional SCI invalidation scheme serially notifies each element of the list to invalidate its copy and requires each element of the list to respond to an invalidate request from the head of the list by sending the head an invalidate response. If there are ten elements of a list, for example, the nine non-head elements must each send an invalidate response through the system interconnect 20 to the node that is the head of the list.

Figure 6:
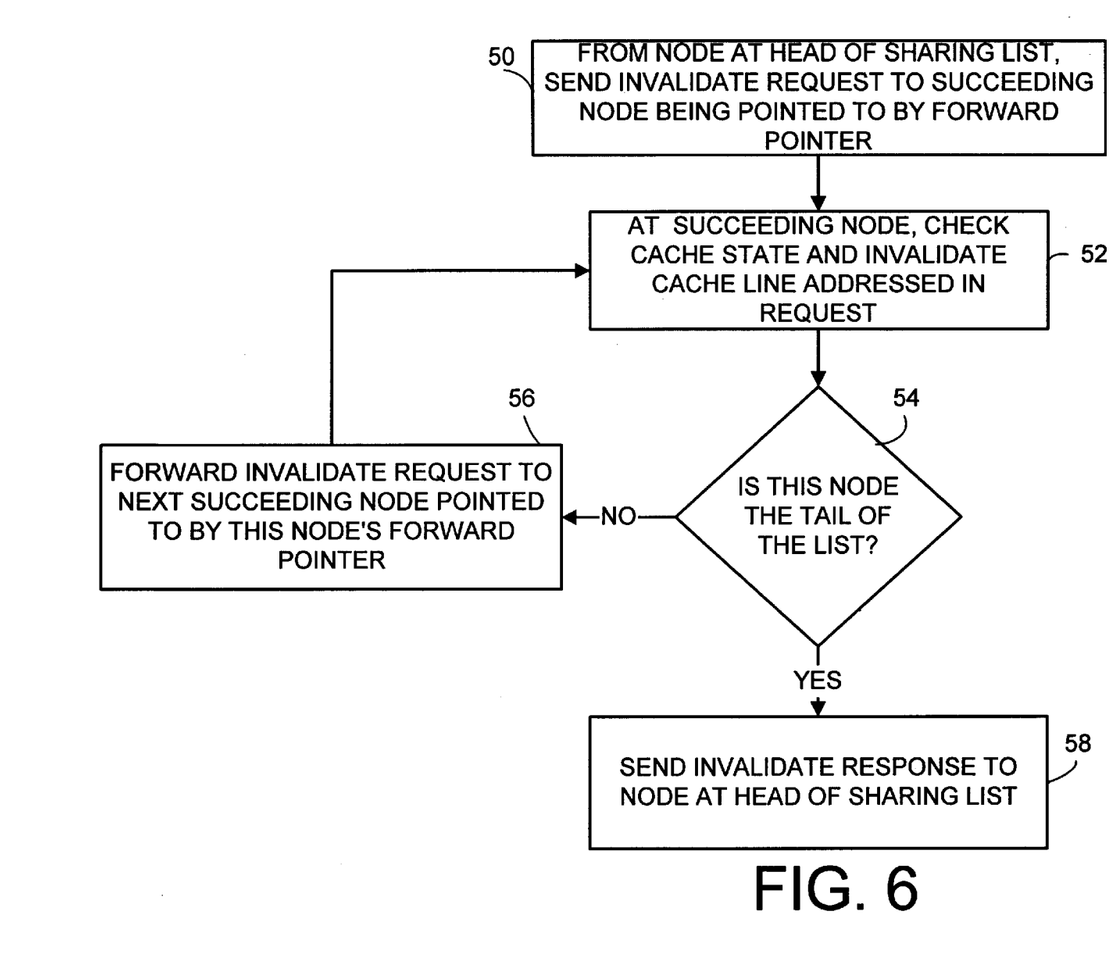
FIG. 6 is a flowchart of a method of invalidating a sharing list in accordance with the invention.

A method in accordance with the invention for invalidating a sharing list that avoids this requirement of multiple responses is illustrated generally in the flow chart of FIG. 6. From the node at the head of the sharing list, a invalidate request is sent to the succeeding node in the list, which is pointed to by the forward pointer of the head cache line (step 50). The succeeding node receives the invalidate request, checks the status of the addressed cache line, and invalidates the cache line (i.e., changes the status of the cache line to CS_INVALID) by sending an invalidate request to its node bus (step 52). The succeeding node also determines from its checked cache status if it is the tail of the sharing list (e.g., CS_MID_VALID or CS_TAIL_VALID) (step 54). If it is not, this node forwards the invalidate request to the next succeeding node on the sharing list, which is pointed to by the forward pointer of this node's addressed cache line (step 56). The next succeeding node then checks the status of its addressed cache line, invalidates the cache line, and determines if it is the tail of the list (steps 52 and 54). Steps 56, 52, and 54 are then repeated for each next succeeding node on the list until a node determines that it is the tail of the list. The tail node sends an invalidate response to the head node of the sharing list and includes in that response its original tail cache state (step 58). The sharing list has now been successfully purged, with each node except the head having an invalid cache state.

Figure 7A:
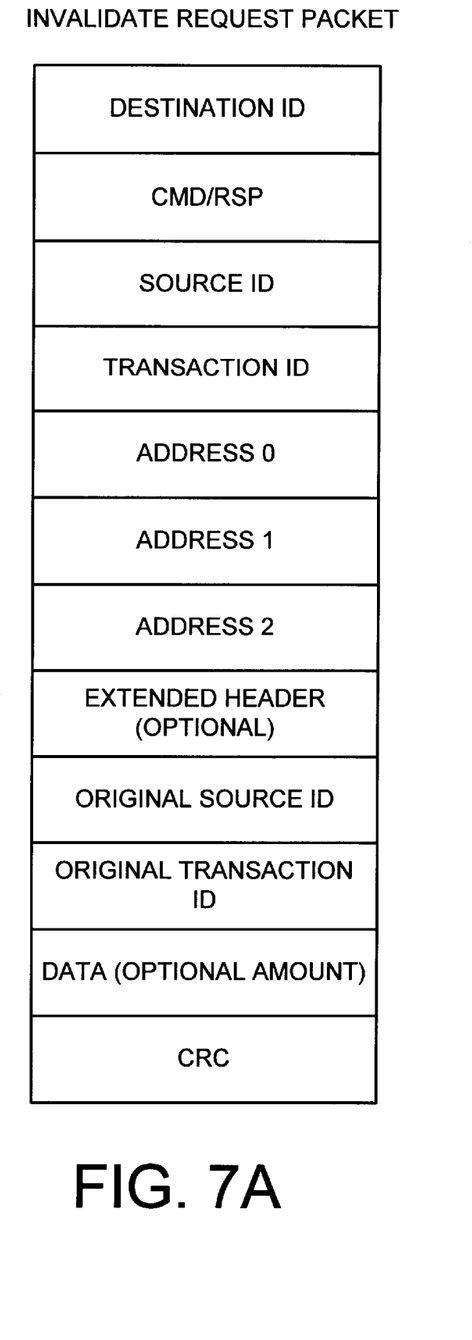
FIGS. 7A and 7B show the fields of an invalidate request packet and invalidate response packet in accordance with the invention.
Figure 7B:
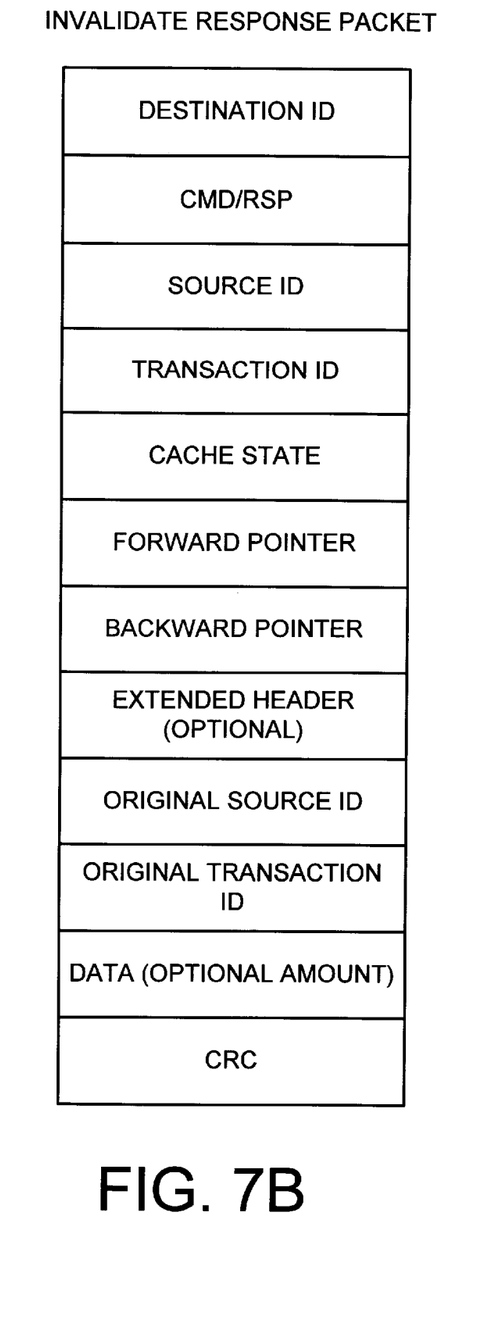

In the illustrative embodiment, the nodes communicate the invalidate request and response to each other through data packets such as those shown in FIGS. 7A and 7B. The invalidate request packet in FIG. 7A is similar to the packet used in the conventional SCI invalidation scheme but with some significant changes. As in the standard scheme, a Destination ID field designates the node to which the packet is destined, a Source ID field designates the node from which the packet is sent, and three Address fields give the address of the cache line on the destination node. Unlike the standard scheme, however, the packet also includes fields for the Original Source ID (the head of the list) and the Original Transaction ID. These two fields are stored in an area of the Extended Header field unused by the SCI invalidation packet. Each succeeding node changes the Source and Destination ID fields of the invalidate request packet so as to forward the packet to the next succeeding node on the list. The contents of the rest of the packet fields remain the same. This forwarding of the invalidate request packet continues until the tail node receives the packet.

Recognizing its status as the tail of the list, the tail node reads the Original Source ID and Transaction ID fields to determine the identity of the head of the list. The tail node then generates the invalidate response packet of FIG. 7B, inserting the head of the list in the Destination ID field and itself in the Source ID field. The tail node also writes into the Address fields its cache state before invalidation (CS_TAIL_VALID) and its forward and backward pointers. The response packet is then transmitted to the head node of the list to confirm that the sharing list has been successfully purged.

In the illustrative embodiment, the method of the invention is the first choice for invalidating a sharing list. If the method fails for some reason, however, then the standard invalidation scheme is followed by default. For example, a node may be unable to forward an invalidate request to the next node on the list because the queue of the forwarding node is full. In this circumstance the forwarding node instead sends a standard invalidate response packet back to the head of the list. This response includes, of course, a forward pointer to the succeeding node on the list. The head of the list then invokes the method again and sends the invalidate request to the next succeeding node on the list. The method then proceeds as shown and described above unless the request packet again cannot be forwarded.

Figure 8A:
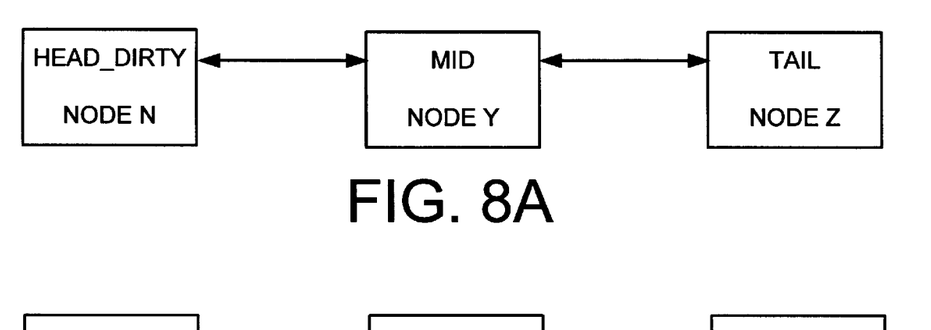
FIGS. 8A–C are a series of figures showing a sharing list invalidation scheme in accordance with the invention.
Figure 8B:
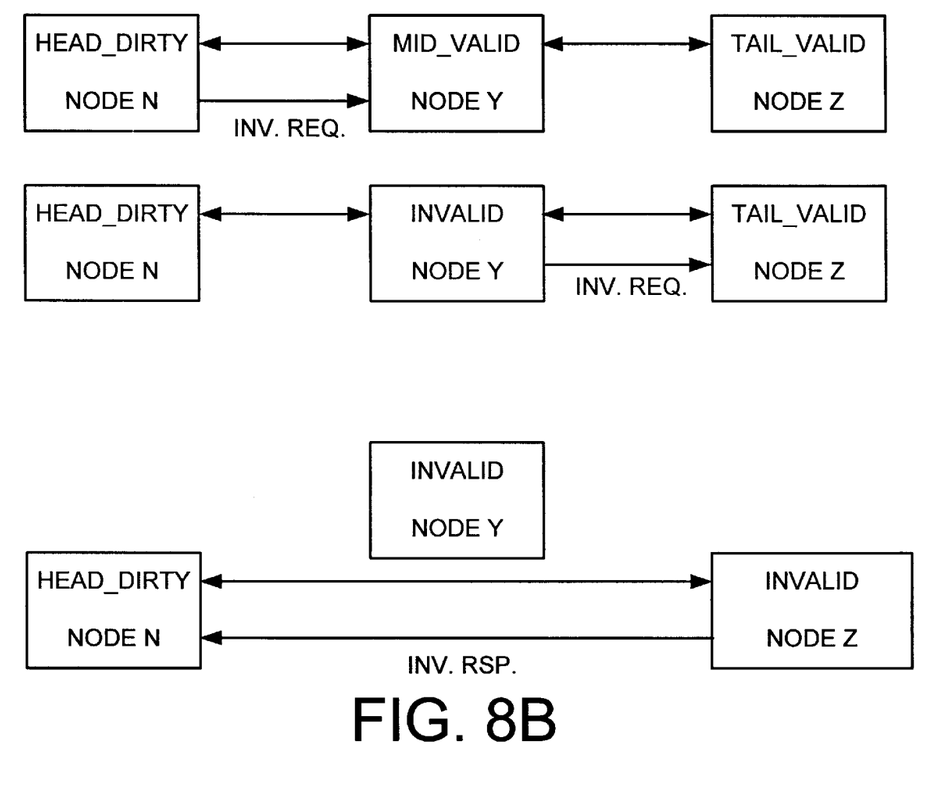
Figure 8C:
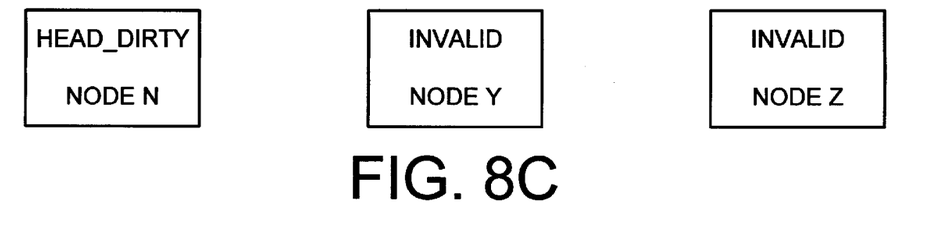

FIGS. 8A–C are a series of figures showing how a sharing list invalidation scheme works in accordance with the invention. In FIG. 8A, the state of a sharing list is shown before the scheme is initiated. Node N is the head of the list, node Y is a mid element of the list, and node Z is the tail of the list. In FIG. 1B, node N issues an invalidate request to node Y to remove itself from the list. Node Y responds by changing its state to invalid and by forwarding the invalidate request to node Z. Node Z receives the invalidate request and responds by changing its state to invalid and sending an invalidate response to Node N. FIG. 8C shows the state of the nodes after the invalidate response has been received by Node N. The state of the cache line on node N indicates that only its cache line now has valid data (even the memory data is invalid). The states of the cache lines on nodes Y and Z indicate that their copies of the data are invalid.

Key Results

Tests of embodiments of the invention have shown a significant reduction in the time required to invalidate a sharing list. For a list comprised of three elements (head, one mid element, and a tail), the inventive scheme invalidated the list 18% faster than the standard scheme. In addition it reduced the traffic on the system interconnect 20 because the response of the mid element has been eliminated. It also reduced the bus clocks required by the protocol engine 40 on the head node to invalidate the sharing list by about 28%.

Having illustrated and described the principles of the invention in an exemplary embodiment, it should be apparent to those skilled in the art that the illustrative embodiment can be modified in arrangement and detail without departing from such principles. For example, the invention may be used in other cache coherence protocols and for purposes other than invalidating a sharing list, such as communicating a request from a requesting node to a number of responding nodes on a list. Many of the software aspects of the embodiment may be implemented in hardware and many of the hardware aspects may be implemented in software. In view of the many possible embodiments to which the principles of the invention may be applied, it should be understood that the illustrative embodiment is intended to teach these principles and is not intended to be a limitation on the scope of the invention defined in the following claims. We therefore claim as our invention all that comes within the scope and spirit of these claims and their equivalents.

We claim:

1. In a computer having a number of interconnected nodes each containing a remote cache of cache lines, a method of invalidating cache lines on different nodes linked in a sharing list having a head node and one or more succeeding nodes, the method comprising:

a. from a node at the head of the list, sending an invalidate request to a succeeding node on the list;

b. in response to receiving the invalidate request, checking a state of the succeeding node's cache line to determine whether the succeeding node is the tail of the list, and invalidating the cache line on the succeeding node;

c. if the succeeding node is not the tail of the list, forwarding the invalidate request to the next succeeding node on the list and repeating steps b and c;

d. if the succeeding node is not the tail of the list but cannot forward the invalidate request to the next succeeding node, sending an invalidate response to the node at the head of the list and repeating steps a through d; and e. if the succeeding node is the tail of the list, sending an invalidate response to the node at the head of the sharing list.

2. The method of claim 1 wherein an invalidate response sent by a node that is not the tail of the list contains a forward pointer to the succeeding node on the list.

3. The method of claim 1 wherein each step at a node is performed by a protocol engine on the node.

4. The method of claim 1 wherein the invalidate request is forwarded in the form of a data packet that includes a field for storing the identification of the head of the list.

5. The method of claim 1 wherein the invalidate response is made in the form of a data packet that includes a field for storing the cache state of the cache line of the node at the tail of the list.

6. A computer-readable medium on which is stored a computer program for executing the steps of claim 1.

7. In a computer having a number of interconnected nodes each containing a remote cache of cache lines, a method of invalidating cache lines on different nodes linked in a doubly linked sharing list having a head node and one or more succeeding nodes, the method comprising:

a. from the node at the head of the list, sending an invalidate request to a succeeding node pointed to on the list by the head node;

b. in response to receiving the invalidate request, checking a state of the succeeding node's cache line to determine whether the succeeding node is the tail of the list, and invalidating the cache line on the succeeding node;

c. if the succeeding node is not the tail of the list, forwarding the invalidate request to the next succeeding node pointed to on the list by the succeeding node and repeating steps b and c; and d. if the succeeding node is the tail of the list, sending an invalidate response to the node at the head of the sharing list.

8. The method of claim 7 wherein the invalidate request forwarded to each of the succeeding nodes includes the identification of the head of the list.

9. The method of claim 7 including, if a node that is not the tail of the list cannot forward the invalidate request to the next succeeding node, sending the invalidate response from the node to the node at the head of the list.

10. The method of claim 7 wherein each step at a node is performed by a protocol engine on the node.

11. The method of claim 7 wherein the invalidate response is made in the form of a data packet that includes a field for storing the cache state of the cache line of the node at the tail of the list.

12. In a computer having a number of interconnected nodes each containing a remote cache of cache lines, a method of invalidating cache lines on different nodes linked in a sharing list having a head node and one or more succeeding nodes, the method comprising:

a. from a node at the head of the list, sending an invalidate request packet to a succeeding node on the list, the packet including a field identifying the destination of the packet and a field identifying the head of the list;

b. in response to receiving the invalidate request packet, checking a state of the succeeding node's cache line to determine whether the succeeding node is the tail of the list, and invalidating the cache line on the succeeding node;

c. if the succeeding node is not the tail of the list, forwarding the invalidate request packet to the next succeeding node on the list, the destination identification field changing to identify the succeeding node but the field identifying the head of the list remaining unchanged, and repeating steps b and c; and d. if the succeeding node is the tail of the list, sending an invalidate response packet to the node at the head of the sharing list, the response packet including a field providing the cache state of the cache line of the node at the tail of the list.

13. The method of claim 12 including, if a node that is not the tail of the list cannot forward the invalidate request to the next succeeding node, sending the invalidate response from the node to the node at the head of the list.

* * * * *